F. J. SCHMITZ.
BANANA SHIPPING CRATE.
APPLICATION FILED DEC. 16, 1915.
1,199,825.
Patented Oct. 3, 1916.
2 SHEETS—SHEET 2.
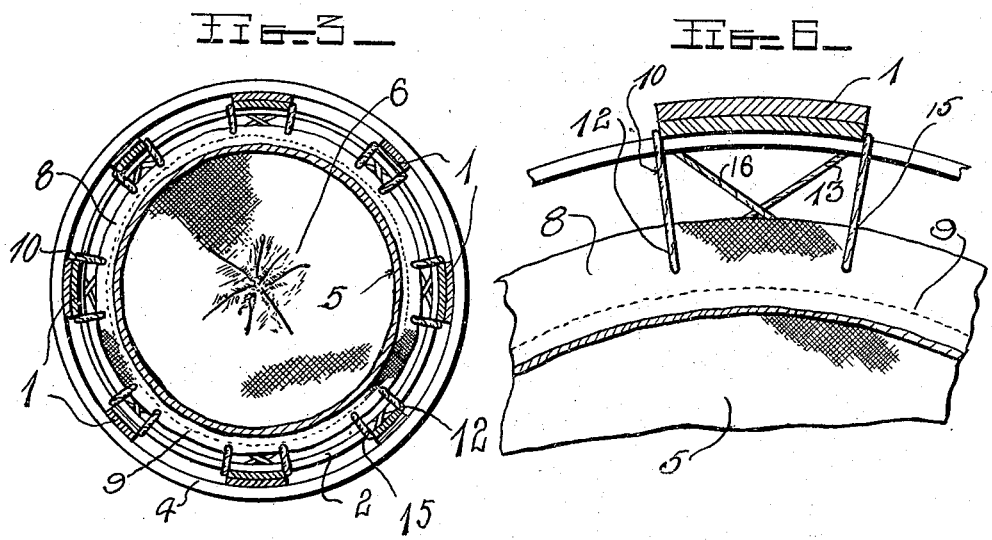
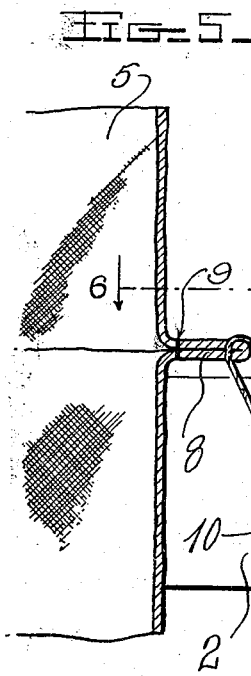
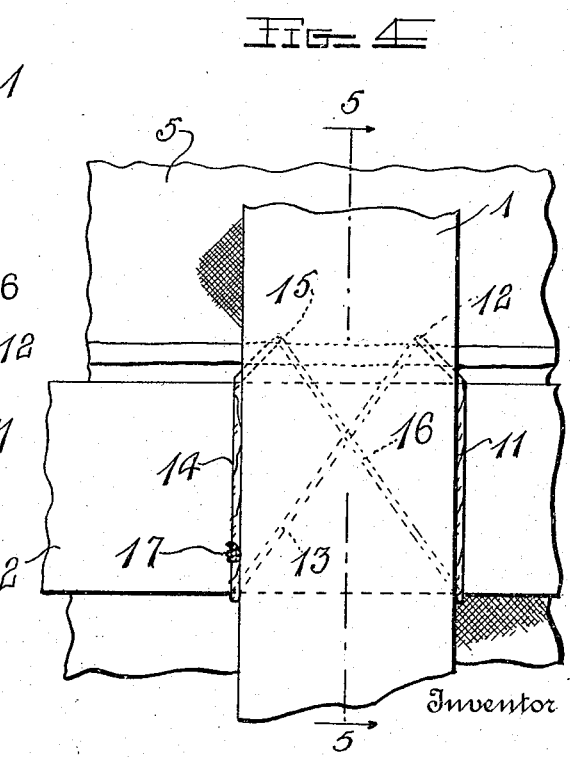
Witnesses
George W. Giovannetti
Inventor
F. J. Schmitz
By H. B. Willson &co
Attorneys

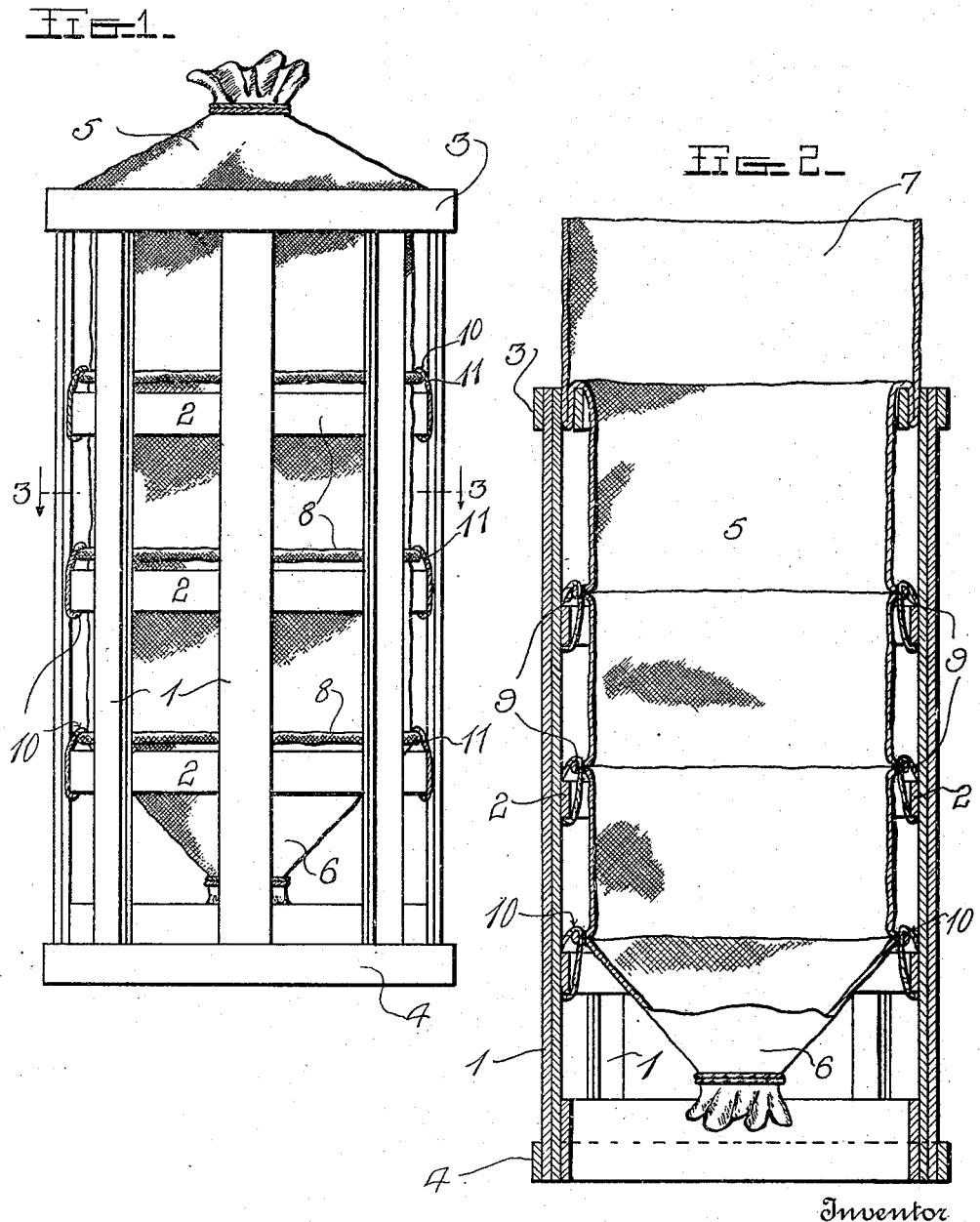

UNITED STATES PATENT OFFICE.

FRANK J. SCHMITZ, OF STREATOR, ILLINOIS.

BANANA-SHIPPING CRATE.

1,199,825.  Specification of Letters Patent.  Patented Oct. 3, 1916.

Application filed December 16, 1915. Serial No. 67,205.

*To all whom it may concern:*

Be it known that I, FRANK J. SCHMITZ, a citizen of the United States, residing at Streator, in the county of La Salle and State of Illinois, have invented certain new and useful Improvements in Banana-Shipping Crates; and I do declare the following to be a full, clear, and exact description of the invention, such as will enable others skilled in the art to which it appertains to make and use the same.

This invention relates to shipping crates and more particularly to crates for shipping bananas and similar perishable fruits.

The object of the invention is to provide a crate of this character, the container or bag of which is so supported within the frame that it is held both longitudinally and laterally so that all possibility of the contents thereof being bruised or crushed is avoided.

Another object is to provide peculiar means for connecting the bag to the frame, whereby all possibility of said means coming in contact with the contents of the bag is prevented.

With these and other objects in view, the invention consists of certain novel features of construction, and the combination and arrangement of parts to be more particularly described and claimed.

In the accompanying drawings: Figure 1 represents a side elevation of a crate constructed in accordance with this invention; Fig. 2 is a longitudinal vertical section through the frame with the container or bag shown in side elevation; Fig. 3 is a transverse section taken on the line 3—3 of Fig. 1; Fig. 4 is an enlarged detail side elevation; Fig. 5 is a vertical section taken on the line 5—5 of Fig. 4; and Fig. 6 is a transverse section taken on the line 6—6 of Fig. 5.

In the embodiment illustrated, a frame is shown composed of longitudinally extending slats 1 and connecting circumferentially extending longitudinally spaced hoops 2 which are here shown arranged within the slats 1 and may be connected thereto in any suitable or desired manner by any suitable means. Reinforcing strengthening hoops 3 and 4 are here shown disposed outside the slats 1, whereby the frame is strengthened at its opposite ends. Mounted within this frame, is a container in the form of a bag 5 having a conical bottom 6 and an open top 7 such as is found in ordinary bags of this character. This bag may be composed of any suitable material, preferably of burlap, and is provided intermediate of its ends with a plurality of longitudinally spaced laterally extending tucks 8 which extend circumferentially around the bag and are formed in the usual manner of forming tucks, by laying loops or folds in the fabric and stitching the side members thereof together adjacent the body of the bag, as shown at 9. These tucks 8 may be of any desired width and are designed for connecting the bag to the hoops of the frame, as will be presently described. This bag 5 is fixedly mounted at its open end on the upper end of the frame, being preferably stretched over the inner hoop of said frame as shown in Fig. 2, and is of a diameter less than the diameter of the frame, so that the side walls of the bag will at all times be positioned out of contact with the frame, and to provide ample space for stretching the bag laterally within the frame.

The tucks 8, three of which are here shown, are positioned above the upper edges of the hoops 2 and are connected at intervals by fastening cords 10 to the adjacent hoops 2. Any desired number of these cords 10 may be employed according to the size of the crate. Each cord 10 is here shown connected at the intersection of one of the slats 1 with the hoops 2, and has one end 11 arranged on the outer face of the hoop 2 adjacent one side edge of the slat 1, and is extended upwardly over the upper edge of said hoop and then inwardly and passed downwardly through the tuck 8 arranged above the hoop as shown at 12. This cord is then extended diagonally across the inner face of the hoop 2 as shown at 13, and passed around the lower edge thereof on the outer face of the hoop adjacent the opposite side of the slat 1, and then extended transversely across the outer face as shown at 14 along the side edge of the slat, and then is extended inwardly and passed downwardly through the tuck 8, as shown at 15. The cord is then extended diagonally across the inner face of the hoop 2 as shown at 16, to the side of the slat 1 in contact with which the end 11 is placed. This cord then extends around the lower edge of the hoop 2, upwardly on the outer face thereof adjacent the side edge of the slat 1, and is connected with the end 11 by knotting, as shown at 17. By drawing this cord tightly, it will be obvious that the bag will be stretched longitudinally and laterally, and will be held thereby spaced from the side walls of the frame at any desired distance, it of course being desirable to position the bag as nearly equal at all points from the various side walls so that it will be arranged centrally as far as possible in respect to these walls. By so forming the bag with the laterally extending circumferentially arranged tucks positioned beyond the edges of the hoops to which they are to be connected, and by arranging the cords 10 as above described, all possibility of the contents of the bag being injured either by contact with the securing cords or by engagement with the side walls of the frame, is prevented.

After the bunch of bananas or other fruit to be shipped has been inserted in the bag 5 as shown in Fig. 2, the upper end of this bag is drawn together and secured by tying or otherwise for closing the bag as shown in Fig. 1, and the crate is then ready to be shipped.

I claim as my invention:

1. The combination with a frame comprising longitudinal slats and connecting hoops; of a bag suspended within the frame and having a laterally extending circumferential tuck formed therein on its outer face, and cords extending transversely through said tuck and around one of said hoops, said hoop and tuck being so positioned relatively to each other as to exert a longitudinal and lateral stretching action on the bag when the cords are tightened.

2. The combination with a frame comprising longitudinal slats and connecting hoops; of a bag suspended within the frame and having laterally extending longitudinally spaced circumferential tucks formed therein, and cords extending transversely through said tucks at longitudinally spaced intervals, each of said cords being crossed on the inner face of the adjacent hoop and extended transversely across the outer face of said hoop with the ends thereof secured together.

3. The combination with a frame comprising longitudinally extending slats and circumferentially arranged connecting hoops; of a bag suspended within the frame and having laterally extending longitudinally spaced circumferentially arranged tucks formed therein, and a plurality of cords connecting each of said tucks with an adjacent hoop, each cord being arranged at the point of intersection of one of the slats with a hoop, said cord extending transversely through the tuck adjacent said hoop at points spaced inwardly from the side edges of the intersecting slat, said cord being extended diagonally across the inner face of the hoop and crossing intermediately the width thereof and passed around the lower edge of the hoop at points opposite the side edges of the slat, said cord being extended on the outer face of the hoop in contact with the opposed edges of the slat, and the ends of said cord being secured together adjacent one of the side edges of said slat, whereby a pulling action is exerted by said cord on said bag on the tightening of the cord.

In testimony whereof I have hereunto set my hand in presence of two subscribing witnesses.

FRANK J. SCHMITZ.

Witnesses:
 THURLOW G. ESSINGTON,
 EFFIE COOK.